(12) United States Patent
Ittara et al.

(10) Patent No.: US 7,244,772 B2
(45) Date of Patent: Jul. 17, 2007

(54) PROCESS FOR PREPARING POLYURETHANE POLYOL AND RIGID FOAMS THEREFROM

(75) Inventors: Suresh Kattimuttathu Ittara, Andhra Pradesh (IN); Kishanprasad Vadi Sarangapani, Andhra Pradesh (IN)

(73) Assignee: Council of Scientific and Industrial Research, New Delhi (IN)

( * ) Notice: Subject to any disclaimer, the term of this patent is extended or adjusted under 35 U.S.C. 154(b) by 0 days.

(21) Appl. No.: 10/879,473

(22) Filed: Jun. 30, 2004

(65) Prior Publication Data

US 2006/0004115 A1    Jan. 5, 2006

(51) Int. Cl.
C08G 18/28 (2006.01)
C07C 37/00 (2006.01)

(52) U.S. Cl. ............... 521/172; 521/170; 521/174; 568/716; 568/749; 568/763; 568/780; 568/793; 568/810; 568/811

(58) Field of Classification Search .......... 568/780, 568/716, 749, 763, 793, 810, 811; 521/170, 521/174, 172
See application file for complete search history.

(56) References Cited

U.S. PATENT DOCUMENTS

| | | | | |
|---|---|---|---|---|
| 1,725,791 A | * | 8/1929 | Harvey | ............................ 528/3 |
| 2,317,585 A | * | 4/1943 | Solomon | ..................... 568/780 |
| 2,470,808 A | | 5/1949 | De Groote et al. | |
| 2,758,986 A | * | 8/1956 | Mecum | ....................... 528/101 |
| 4,454,248 A | * | 6/1984 | Pollock et al. | ................. 521/53 |
| 6,051,623 A | | 4/2000 | Sticlau | |
| 2005/0192423 A1 | * | 9/2005 | Niesten et al. | ................. 528/49 |

FOREIGN PATENT DOCUMENTS

DE    100 04 427 A1    10/2001

OTHER PUBLICATIONS

International Search Report, Jan. 2005.
Strocchi et al., "Cardanol in Germ and Seed Oils Extracted from Cashew Nuts obtained by the Oltremare Process" Journal of the American Oil Chemists' Society, vol. 56(1979)pp. 616-619, p. 617.
Izzo et al., "Cashew Nut Shell Liquid. VII. The Higher Olefinic Components of Cardanol", Journal of Organic Chemistry, vol. 15,(1950)p. 707-714, XP002313980.
Pillai, "Polymeric Materials From Renewable Resources: High Value Polymers from Cashew Nut Shell Liquid", Popular Plastics and Packaging, Pastindia, Special Issue(2000)pp. 79-90, XP001204902.

* cited by examiner

Primary Examiner—John M. Cooney, Jr.
(74) Attorney, Agent, or Firm—Nixon & Vanderhye P.C.

(57) ABSTRACT

We describe a process for the preparation of polyurethane polyol from CARDANOL 3-(8pentadecenyl)phenol, derived from cashew nut shell liquid (CNSL), a renewable resource material. The polyol is made by oxidation with peroxy acid generated in situ to give epoxidised CARDANOL 3-(8-pentadecenyl)phenol and the epoxy derivative is converted to the polyol in the presence of the organic acid. The cardanol-based polyol may be reacted with isocyanate to form polyurethane. Alternatively blowing agents are included with the cardanol-based polyol before it is reacted with the isocyanate. These polyols are especially suitable for making rigid foams of very low density and high compressive strength.

20 Claims, 1 Drawing Sheet

PROCESS FOR PREPARING POLYURETHANE POLYOL AND RIGID FOAMS THEREFROM

FIELD OF THE INVENTION

Figure 1:
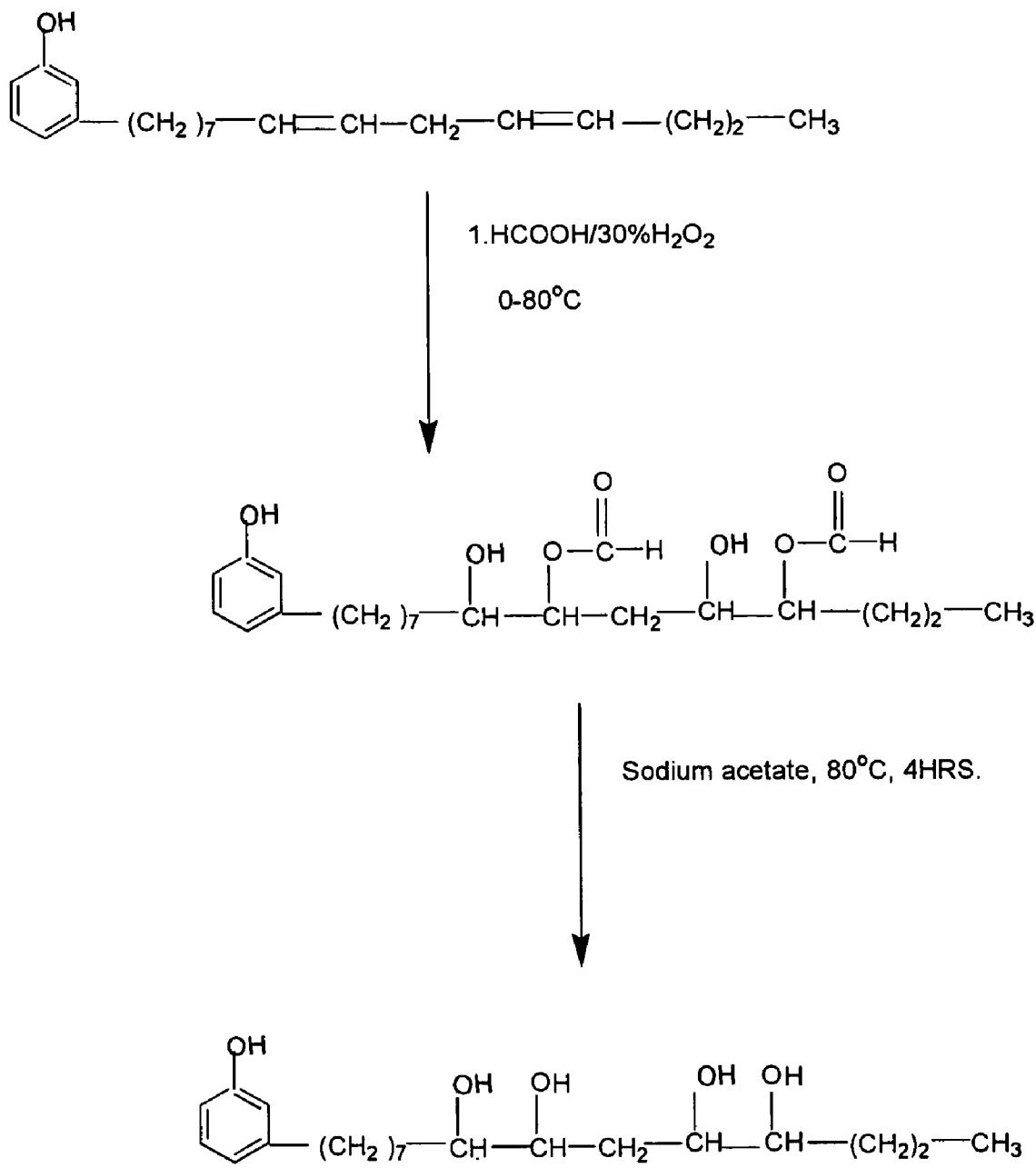

The present invention relates to a process for the preparation of polyurethane polyol from CARDANOL 3-(8-pentadecenyl)phenol and rigid foams therefrom. The process provides polyurethane polyols suitable in the preparation of rigid polyurethane foams starting from a renewable resource material, Cashew Nut Shell Liquid (hereinafter abbreviated as CNSL).

BACKGROUND OF THE INVENTION

The disclosed novel polyurethane polyol is derived from CARDANOL 3-(8-pentadecenyl)phenol, a product obtained from natural CNSL and is the main constituent of technical grade CNSL. Cashew Nut Shell Liquid (CNSL) has been known for years to contain compounds useful in various aspects of chemical industry. Technical grade or distilled CNSL is a commercially available product. It comprises in major proportions (typically more than 95% by weight) a material also sold separately under the trade name CARDANOL 3-(8-pentadecenyl)phenol, which is a substituted phenol possessing an alkyl chain of average unsaturation two double bonds in the meta position. Other minor constituents are cardol and 2-methyl cardol. CARDANOL 3-(8-pentadecenyl)phenol is used in many industrial applications such as coatings, resins, adhesives and other novel products. Novel polyols of the present invention are used in making rigid PU foams. The reaction of diisocyanate and or poly isocyanate with the hydroxyl groups of polyol co reactants and blowing agents (such as water, dichloromethane, cyclopentane and HCFC's) are used to produce polyurethane foams. Rigid polyurethane foams are primarily used for thermal insulation. Polyurethane foams constitute the largest category of cellular polymeric materials. They offer an attractive balance of performance characteristics such as aging properties, mechanical strength, elastic properties, and chemical resistance, insulating properties and cost.

Polyols based on petroleum resources are costly and scarce. Some of them such as polyester polyols also possess poor resistance to hydrolysis and poor abrasion resistance. It is of particular interest to develop polyols which may be easily and cheaply obtained form readily available and renewable resource material such as CNSL. Its use in the preparation of polyurethane polyols suitable for making rigid foams is not reported. For the preparation of polyols from renewable resources like vegetable oils several processes are disclosed in the literature. Reference may be made to U.S. Pat. No. 6,107,433 which disclose process for preparing vegetable oil based polyol from castor oil by oxidation of the side chain unsaturation using per acids and a method for making polyurethane castings using these polyols. In another patent [U.S. Pat. No. 4,825,004] a process for the production of alkane polyols starting from natural fatty acid derivatives by per acid oxidation is disclosed. However, these prior art processes have not been reported with cardanol before for making polyurethane polyols. Because of the unique molecular structure of cardanol (a long unsaturated side alkyl chain on the benzene ring) the disadvantages disclosed in the prior art process, is not applicable in the case of cardanol. For example, the hydrolysis of triglyceride oils is not expected in the case of cardanol.

OBJECTS OF THE INVENTION

An object of the present invention is to provide a process for the preparation of polyurethane polyol from CARDANOL 3-(8-pentadecenyl)phenol and rigid foams therefrom.

Still another object of the present invention is to provide a method for making cardanol based Polyols having a desirable viscosity and high content of hydroxyl groups.

Yet another object of the present invention is to provide a rigid PU foam, made form Cashew Nut Shell Liquid based polyols having improved mechanical, hydrolytic stability and insulation properties over conventional rigid foams and a method for making such polyols so is that rigid foam having excellent insulating properties may be provided.

Still another object of the present invention is to provide a method for making various cardanol based polyols having a favorable distribution of hydroxyl groups in the molecule so that these polyols are reacted with isocyanantes.

BRIEF DESCRIPTION OF THE ACCOMPANYING DRAWING

In the drawing accompanying this specification FIG. 1 represents the general scheme for the peracid oxidation and subsequent hydrolysis starting with the diene component (I) of cardanol.

SUMMARY OF THE INVENTION

Accordingly the present invention provides a process for the preparation of polyurethane polyol from CARDANOL 3-(8-pentadecenyl)phenol and rigid foams therefrom comprising oxidizing technical grade Cashew Nut Shell Liquid (CNSL) containing CARDANOL 3-(8-pentadecenyl)phenol as the main component (>95%) with a peracid generated in situ from hydrogen peroxide and an organic acid in presence of a catalyst, in order to oxidise the unsaturation in the side chain of CARDANOL 3-(8-pentadecenyl)phenol, the ratio of CARDANOL 3-(8-pentadecenyl)phenol to $H_2O_2$ employed being 1:2, the ratio of CARDANOL 3-(8-pentadecenyl)phenol to organic acid is 1:1, the ratio of CARDANOL 3-(8-pentadecenyl)phenol to organic acid to hydrogen peroxide being 1:1:2, the reaction temperature being in the range of 0° and 80° C., maintaining the mixture at the reaction temperature to produce a hydroxy-formoxy ester, subjecting the hydroxy-formoxy ester to hydrolysis with sodium acetate to produce the polyol, and separating the polyol from the unreacted reactants, and reacting the polyol with isocyanate and blowing agent under suitable conditions to obtain a rigid foam.

In one embodiment of the invention, the organic acid is selected from the group consisting of formic acid and acetic acid.

In one embodiment of the invention, the catalyst is 10% $H_2SO_4$.

In one embodiment of the invention, the starting material is extracted from seeds of *Anacardium oxidentale* by high temperature distillation under vacuum.

In one embodiment of the invention, the polyol obtained has a hydroxyl value in the range of 200–600 typically 350–400 mg KOH/g and viscosity less than 250 poise, typically 100 poise.

In one embodiment of the invention, the reaction temperature is preferably in the range of 25–35° C.

In one embodiment of the invention, wherein an intermediate product comprising an epoxide is produced which is hydrolyzed to an ester alcohol in the presence of excess acid.

In one embodiment of the invention, wherein an intermediate product comprising a hydroxyester is obtained which is hydrolyzed to the polyol using alkali.

BRIEF DESCRIPTION OF THE ACCOMPANYING DRAWING

FIG. 1 is a non-limiting representation of the reaction scheme of the process of the invention.

DETAILED DESCRIPTION OF THE INVENTION

The present invention provides a process for the preparation of polyurethane polyol from CARDANOL 3-(8-pentadecenyl)phenol and rigid foams therefrom which comprises treatment of CARDANOL 3-(8-pentadecenyl)phenol or technical CNSL whereby the unsaturation present in the side chain gets oxidized using the peracid generated in situ from a peroxide and organic acid, such as formic or acetic acid in presence of a mineral acid catalyst like $H_2SO_4$ and the preferred ratio of CARDANOL 3-(8-pentadecenyl)phenol to formic acid is 1:1 or ratio of cardanol to $H_2O_2$ 1:2 and the process is carried out at temperatures between 0–80° C., preferably 25–35° C. to give the ester alcohol which is hydrolyzed under alkaline conditions to produce the product polyol that is separated from the uncombined reactants to produce the product polyol.

The process of adding a peroxide to cardanol and formic or acetic acid where in the peroxy acid generated in-situ reacts with cardanol unsaturation to form epoxidised cardanol and the epoxidised cardanol in presence of excess acid is converted to the hydroxyl ester, hydrolyzed by alkali to give the polyol. In another embodiment a process for the preparation of polyols from cardanol especially suitable in the making of rigid polyurethane foams by oxidation with per acids, the unique molecular structure of cardanol allows the use of a variety of per acids, which can be prepared, in situ in the hydroxylation reaction and the product polyol is useful for making rigid foam, composites, and PU plastics and it has low viscosity and high hydroxyl functionality obtained using the formulation comprising of technical CNSL, 30% $H_2O_2$, HCOOH, $CH_3COOH$ and a catalytic amount of $H_2SO_4$ and an alkali. An oxidation reaction suitable for the conversion of olefins to epoxide and subsequently to hydroxyl function is described. A method for making the PU foam from the developed polyols is also disclosed. The method includes mixing together of the dried polyol, blowing agent, isocyanate, and catalyst in suitable cup of standard dimensions.

The present invention disclosing the synthesis of polyol based on renewable resource material has been developed for various applications. The disclosed novel polyol is derived from cardanol, a product obtained by treating cashew nut shell liquid. CNSL consists primarily of anacardic acid which is decarboxylated when heated in the presence of acid giving cardanol; a meta substituted phenol used in this invention. The side chain in cardanol contains an average of two double bond per molecule, which on oxidation with peracid and subsequent saponification yields tetra functional polyols. One particular use is for making rigid polyurethane foams. Polyols useful in the preparation of rigid foams should have specific foam rise characteristics as tested by the cup foam method, the preferred method for evaluating the polyols in making rigid foams.

The method of the present invention involves making cardanol-based polyols by converting the double bond s present in the alkenyl chain in to hydroxyl groups. This method takes place at approximately atmospheric pressure.

The process of the present invention involves epoxidation and subsequent hydroxylation of cardanol so as to make a polyol. More specifically the process of the present invention involves adding a peroxide in the presence of an organic acid to generate the per acid in situ wherein the peracid and cardanol react to form epoxidised cardanol, the said epoxidised product undergoes conversion to ester and hydroxyl compound. These are consecutive non-stop processes as the intermediate product is directly subjected to the next step without further isolation and purification. The reaction is not stopped after the epoxidised cardanol so as to purify the intermediate product.

Any peroxy acid may be used in the reaction. Example of peroxy acids that may be used include, but are not limited to, peroxy formic acid, peroxy acetic acid, trifluoroperoxyacetic acid, benzyloxyperoxy formic acid, m-chloroperoxybenzoic acid, or any combination of these peroxy acids. The peroxy acids may be formed in situ by reaction of a hydroperoxide with the corresponding acid, such as formic acid or acetic acid. Examples of hydro peroxides that may be used include, but are not limited to, hydrogen peroxide, t-butyl hydro peroxides, triphenyl silyl hydro peroxides, cumyl hydro peroxides, or any combination of these hydro peroxides. Preferably the peroxy acid is in a solvent such as formic acid, acetic acid, chloroform, or ethyl acetate.

Water is also an important constituent of this reaction; it reacts with the epoxy groups of the epoxidised cardanol to form two hydroxyl groups per epoxy group in some location so as to increase the hydroxyl content of the cardanol based polyols. Specifically water contributes to a few percent (5–10%) of the hydroxylation.

The catalyst, which is useful in the invention, includes mineral acids like 10% $H_2SO_4$.

Water washing is used to remove the excess acid or alkali present in the product.

The epoxidation reaction occurs approximately at room temperature and temperature should be controlled between 0–80° C. and the preferred temperature is 35° C. for the per formic acid oxidation.

Higher reaction temp can cause the reaction to become violent. The reaction is finished in 30 to 36 hours after that all the reactants are mixed together.

The cardanol based polyol made by the method of the present invention have viscosity in the range of 5000–9000 centipoise at room temperature. Still further the polyols made by the, method of the present invention have hydroxyl values ranging from 350–400 mg/KOH per g determined in accordance with method ASTM D 1957 (1963). The cardanol based polyols can be made in yields of 80–95% using any of the various embodiments of the present invention.

This method of making the polyols is illustrated in the following examples. These examples are not meant in any way to limit the scope of this invention.

EXAMPLE 1

A mixture of 7.82 g of formic acid [0.17 mole] and 50 g of cardanol [0.17 mole] is taken together in a glass vessel and the mixture under stirring is cooled to 0° C. While stirring continued and maintaining the temperature, 38.5 g (0.34 mole) of 30% $H_2O_2$ is added drop wise from a pressure 'equalizing funnel. The addition time required 5–10 hours. During addition the temperature is maintained by a cooling bath.

After completion of the addition, the reaction temperature is increased to 35° C., whereby the epoxy groups present is converted to hydroxyl-formoxy ester. The half ester so produced is hydrolyzed with sodium acetate at 80° C. for 4 hours. The product is neutralized, washed with excess water till neutral to litmus and dried over anhydrous sodium sulphate.

EXAMPLE 2

A mixture of 20 g of formic acid [0.57 mole] and 151 g of cardanol [0.5 mole] is taken together in a glass vessel and the mixture under stirring is cooled to 0° C. while stirring continued and maintaining temperature 116 g 30% (1.02 mole) $H_2O_2$ is added drop wise from a pressure equalizing funnel. The addition is completed in 5–10 hours. During addition the temperature is maintained by a cooling bath.

After the complete addition, the reaction temperature is increased to 35° C., whereby the epoxy groups present is hydrolyzed to hydroxyl-formoxy ester. The half ester so produced is hydrolyzed with sodium acetate at 80° C. for 4 hours. The product is neutralized, washed with excess water till neutral to litmus and dried over anhydrous sodium sulphate.

EXAMPLE 3

In another example a mixture of 19 g of formic acid [0.6 mole] and 150 g of cardanol [0.5 mole] is taken together in a glass vessel and the mixture stirred at cooled to 0° C. while stirring continued and maintaining temperature 115 g 30% (1.02 mole) $H_2O_2$ is added drop wise from a pressure equalizing funnel. The addition is required 5–10 hours. During addition the temperature is maintained by ice cooling at 24–32° C.

After complete addition, the reaction temperature is increased to 35° C., whereby the epoxy groups present is hydrolyzed to hydroxyl-formoxy ester. The half ester so produced is hydrolyzed with sodium acetate at 80° C. for 4 hours. The product is neutralized, washed with excess water till neutral to litmus and dried over anhydrous sodium sulphate.

The mineral acid catalyst such as conc $H_2SO_4$ is used in an amount 0.05% to 5% on the weight of cardanol. At the end of the reaction the product is taken in a separating funnel washed with excess of water till neutral to litmus and dried over anhydrous sodium sulfate.

The dried polyol has the following characteristics.

Yield 80–98% Viscosity—100–220 Poise typically less than 250 Poise. Hydroxyl value—200–600 preferably 350–400 mg KOH/g Acid value less than 5.

In forming the polyurethane, the isocyanate reacts with the hydroxyl groups of the cardanol polyol. The polyol and the isocyanate are mixed in approximately stoichiometric quantities. It is agreeable to use up to about 10% in excess of the stoichiometric quantity of either of these components. Examples of isocyanate that can be selected include, but are not limited to polymeric or crude biphenyl methane diisocyanate (MDI), modified MDI including hydrogenated MDI Isophrone Diisocyanate (IPDI) or 2,4-toluene diisocyanate (TDI). The preferred isocyanate is a polymeric MDI, for example (Suprasec X-2185) having an isocyanate content of 22–31% available form the ICI polyurethane's, Belgium, Lupranate. M20S or Lupranate M70R from BASF or MONDUR MA2601 from BAYER corporation.

Reaction of the polyol with isocyanate such as MDI forms the polyurethane by known methods in the art. The isocyanate is included in the composition to provide a 1:1 mole ratio or more preferably % by weight.

Blowing agents are included in the formulation, typically in proportions of 4–6% by weight.

A catalyst for the isocyanate water reaction is included in the formulation.

A second catalyst for the isocyanate polyol reaction is included in the formulation.

The rigid foam can be formed by mixing together the polyol with the blowing agent, conditioned at 22° C. under atmospheric pressure. The components are preferably mixed to a homogeneous mass, after the mixing the composition is allowed to rise. The foams prepared can be advantageously used in refrigeration where low thermal conductivity is required.

Polyurethane foams based on such cradanol based polyols is expected to have higher thermal stability both in air and nitrogen and lower water absorption than corresponding polyurethane compounds based on polypropylene oxide (PPO) polyols, and compared to other vegetable oil based polyurethane's have better hydrolytic stability and lower absorption of water than corresponding PPO based foams. Still further this foam has density comparable to the PPO based foams.

The following example illustrates the preparation of PU that may be prepared using cardanol based polyol. These examples are not meant in any way to limit the scope of this invention;

EXAMPLE 4

12.46 g of polyol, the product of example 2, 17.59 parts Suprasec X 2185 (MDI), and 5.47 part of blowing agent and 2.8 part of catalyst were mixed.

The polyol mixed with the blowing agent and isocyanate was conditioned at 20° C. for 4 hours. The polyol and isocyanate component were weighed to the cup and stirred for 2 sec. Using a stirrer of standard design for making the cup foam. And allowed to rise freely.

A cup foam test shows the following characteristics. They have typically cream time 10–16 sec, string time 65–95 sec, end of rise time 110–165 sec and tack free time of 160 sec., till the foaming stopped. The foams produced have a compressive strength of 0.038 N/mm$^2$ and density (26.59 gm/cm$^3$) quite comparable to the PPO polyol based foams.

The foams produced have regular cell structure as evidenced by Scanning Electron Microscopy.

From the foregoing, it will be seen that this invention is one, well adapted to obtain all the ends and objects herein above set forth together with other advantages which are obvious and inherent to the structure. It will be understood that certain features and sub combinations are of utility and may be employed without reference to other features and sub combinations. Since many possible embodiments may be made of the invention without departing from the scope thereof, it is to be understood that all matter herein set forth is to be interpreted as illustrative and not in a limiting sense.

REFERENCES

[US Patent Documents]

|  | month/year | Authors |
|---|---|---|
| U.S. Pat. No. 6107433 | August/2000 | Petrovic et al. |
| U.S. Pat. No. 4825004 | April/1989 | Ratzen et al |

OTHER REFERENCES

Gedam et al *Examination of the Components of Cashew Nut shell Liquid by NMR Indian Journal of Chemistry vol.* 10, 388–391,1972.

C. K. S. Pillai, *Polymeric materials from renewable Resources: High value polymers from cashew nut shell liquid, Popular Plastics and Packaging (special Issue)* 79–84, 86–90, 2000.

We claim:

1. A process for the preparation of a polyol from 3-(8-pentadecenyl)phenol comprising:
    (a) oxidizing technical grade Cashew Nut Shell Liquid containing 3-(8-pentadecenyl)phenol as the main component (>95%) with a peracid generated in situ from hydro peroxide and an organic acid in presence of a catalyst, in order to oxidize an unsaturation in 3-(8-pentadecenyl)phenol, the ratio of 3-(8-pentadecenyl) phenol to hydroperoxide employed being 1:2, the ratio of 3-(8-pentadecenyl)phenol to organic acid is 1:1, the ratio of 3-(8-pentadecenyl)phenol to organic acid to hydro peroxide being 1:1:2, and reaction temperature maintained in the range of 0° and 80° C. to produce a hydroxy-formoxy ester;
    (b) subjecting the hydroxy-formoxy ester to hydrolysis with sodium acetate to produce the polyol; and
    (c) separating the polyol from the unreacted reactants.

2. A process as claimed in claim 1 wherein the organic acid is selected from the group consisting of formic acid and acetic acid.

3. A process as claimed in claim 1 wherein the catalyst is 10% $H_2SO_4$.

4. A process as claimed in claim 1 wherein starting material is extracted from seeds of *Anacardium oxidentale* by high temperature distillation under vacuum.

5. A process as claimed in claim 1 wherein the polyol obtained has a hydroxyl value in the range of 200–600 mg KOH/g and viscosity less than 250 poise.

6. A process as claimed in claim 1 wherein the reaction temperature is in range of 25–35° C.

7. A process as claimed in claim 1 wherein an intermediate product comprising an epoxide is produced which is hydrolyzed to an ester alcohol in the presence of excess acid.

8. A process as claimed in claim 1 wherein an intermediate product comprising a hydroxyester is obtained which is hydrolyzed to the polyol using alkali.

9. A process as claimed in claim 1 wherein the peroxy acid is selected from the group consisting of peroxyformic acid, peroxyacetic acid, trifluoroperoxyacetic acid, benzyloxyperoxy formic acid, m-chloroperoxybenzoic acid and any combination thereof.

10. A process as claimed in claim 1 wherein the hydro peroxide is selected from the group consisting of hydrogen peroxide, t-butyl hydro peroxides, triphenyl silyl hydro peroxides, cumyl hydro peroxides and any combination thereof.

11. A process as claimed in claim 9 wherein the peroxy acid is in a solvent selected from the group consisting of formic acid, acetic acid, chloroform, and ethyl acetate.

12. A process for the preparation of a rigid foam from 3-(8-pentadecenyl)phenol comprising:
    (a) oxidizing technical grade Cashew Nut Shell Liquid containing 3-(8-pentadecenyl)phenol as the main component (>95%) with a peracid generated in situ from hydro peroxide and an organic acid in presence of a catalyst, in order to oxidise an unsaturation in 3-(8-pentadecenyl) phenol, the ratio of to hydroperoxide employed being 1:2, the ratio of 3-(8-pentadecenyl) phenol to organic acid is 1:1, the ratio of 3-(8-pentadecenyl)phenol to organic acid to hydro peroxide being 1:1:2, and reaction temperature maintained in the range of 0° and 80° C. to produce a hydroxy-formoxy ester;
    (b) subjecting the hydroxy-formoxy ester to hydrolysis with sodium acetate to produce a polyol;
    (c) separating the polyol from unreacted reactants; and
    (d) reacting the polyol with isocyanate and blowing agent to produce the rigid foam.

13. A process as claimed in claim 1 wherein the polyol obtained has a hydroxyl value in the range of 350–400 mg KOH/g.

14. A process as claimed in claim 1 wherein the polyol obtained has viscosity less than 100 poise.

15. A process as claimed in claim 12 wherein the organic acid is selected from the group consisting of formic acid and acetic acid.

16. A process as claimed in claim 12 wherein the catalyst is 10% $H_2SO_4$.

17. A process as claimed in claim 12 wherein starting material is extracted from seeds of *Anacardium oxidentale* by high temperature distillation under vacuum.

18. A process as claimed in claim 12 wherein the reaction temperature is in range of 25–35° C.

19. A process as claimed in claim 12 wherein the peroxy acid is selected from the group consisting of peroxyformic acid, peroxyacetic acid, trifluoroperoxyacetic acid, benzyloxyperoxy formic acid, m-chloroperoxybenzoic acid and any combination thereof.

20. A process as claimed in claim 12 wherein the hydro peroxide is selected from the group consisting of hydrogen peroxide, t-butyl hydro peroxides, triphenyl silyl hydro peroxides, cumyl hydro peroxides and any combination thereof.

* * * * *